Feb. 19, 1929. 1,702,512
J. H. KARLSON
BEVERAGE MIXER
Filed July 13, 1925    5 Sheets-Sheet 1

Inventor,
Julius H. Karlson

Feb. 19, 1929.
J. H. KARLSON
BEVERAGE MIXER
Filed July 13, 1925

Patented Feb. 19, 1929.

1,702,512

UNITED STATES PATENT OFFICE.

JULIUS H. KARLSON, OF CHICAGO, ILLINOIS, ASSIGNOR TO KAR-LAC COMPANY, OF CHICAGO, ILLINOIS, A CORPORATION OF ILLINOIS.

BEVERAGE MIXER.

Application filed July 13, 1925. Serial No. 43,165.

This invention relates to apparatus for heating or mixing, or both heating and mixing, fluid substances, and particularly to that class of mixers and heaters in which a vessel is moved into and out of assembly with a revolving agitator and, if desired, simultaneously brought into circuit closing connection with a supply of electric current for the purpose of heating the contents of the vessel during the period of agitation.

It has long been proposed to bring a vessel into assembly with an agitator mounted upon a standard, by providing the standard with a step to support the vessel vertically, and a cover or other means for engaging the upper end of the vessel to keep it from tipping upon its step; and it was likewise well known to provide means for similarly holding a vessel in which both the step for supporting the vessel vertically and the means for engaging the vessel to prevent it from tipping upon its step are in the form of hooks or projections which coact with marginal portions of the bottom and top of the vessel, the top-engaging hook being movable vertically to permit assembly of the vessel with the support, but the present invention provides certain improvements in the construction of the supporting step and top sustaining means. Accordingly, one feature of the present invention consists in providing a bottom step for a mixing vessel which includes in its construction a stud projecting from the supporting surface of the step in position to engage the margin of the bottom of the vessel and resist lateral displacement of the vessel from its normal position on the step; also a safety stop in the form of a projection which will receive the bottom margin of the vessel and prevent the vessel from total displacement from the step even when not engaged over the stud which holds the vessel in normal position upon the step; one collateral feature incident to this part of the invention consisting in having a circuit closer, for instance, that which controls the supply of current to the motor for driving the agitator, held closed by the normal position of the vessel with its bottom margin in engagement with the stud on the step, but left open by the location of the vessel with its bottom marginal portion in engagement with the safety stop of the step; and another collateral feature incident to this part of the invention, which may be employed if desired, consisting in having a circuit closer for a heating element on the vessel, for instance, protruding terminals on the vessel entering electric outlet sockets on the step by the positioning of the vessel upon the step, and having this heating circuit closer effective in both positions of the vessel on the step so that it will be possible to apply heat to the contents of the vessel both simultaneously with and independently of the agitating operation. Another novel structural feature of the means for supporting the vessel upon the standard resides in fingers or guards located to conform to the contour of the upper portion of the vessel, either within or without the same, but preferably upon the inside and serving the purpose of preventing the vessel from tipping upon its step, while admitting of sufficient vertical movement of the vessel relatively to the fingers to admit the vessel to the auxiliary and normal stops of the step, after bringing the vessel into engagement with the fingers; one collateral feature incident to the application of these fingers to the inside of the vessel consisting in developing their lower ends in the form of deflectors which break up the vortex of the agitated liquid in the vessel before it reaches the top of the vessel, thereby assisting in the mixing effect and preventing overflow; and another collateral feature incident to the use of said fingers, which may be employed if desired, consisting of a cover for the vessel through which the fingers extend, and means for supporting the cover in position to engage the top of the vessel, with vertical resiliency sufficient to permit upward movement of the vessel in assembly; said last-named means consisting of spring pressed wrist bulbs mounted upon depending pins which are supported on the motor or other convenient member.

Another object of the invention is to provide an improved form of agitator for a mixing apparatus of the kind referred to, and particularly one which operates smoothly and with minimum oscillation at very high rates of revolution; and, to this end, another feature of the invention consists in providing an agitator shaft with a counterpoise near its lower end, having a mass which by its inertia resists deflection of the axis of revolution by influences within the material to be agitated, or vibrations in the motor or its support, or other influences external to the agitator itself; a feature collateral to this part of the invention consisting in constructing the stirring end of the agitator in the form of a pair of wings extending laterally and downwardly from the motor shaft, or downwardly enlarging and preferably separated at their lower extremities by a V-shaped recess between them to provide an end for each vane, which end is preferably deflected transversely to the plane of the vane and rearwardly with respect to the direction of revolution; and still another collateral feature incident to the stirring device consisting in the construction of the joint through which the agitator shaft is connected to the motor shaft, and which involves a long taper pin and socket connection with set screws, symmetrically duplicated or multiplied in order to avoid any imbalance in distribution of mass or weight that would tend to establish an axis of revolution other than the geometrical axis of the parts. A collateral object of the particular tapered joint used between the agitator and motor shafts is that said shafts tend to remain and seek axial disposition due to the high rate of speed at which they revolve and impingement of the vanes on the liquid.

Another object of the invention is to provide means whereby the agitator of a mixing apparatus will be permitted to yield to contact with the vessel during removal of the vessel and thus reduce destructive effects incident to such contact as a result of residual rotation of the agitator after interruption of the current which drives the motor; and, to this end, another feature of the invention consists in trunnioning the motor, from which the agitator rigidly depends, upon an axis transverse to that of the agitator, and in a plane transverse to the direction of withdrawal of the vessel from the apparatus, so that the motor may rock and the agitator may swing in the last-named direction, and resisting this rocking and swinging movement through resilient means interposed between the motor and the standard; one collateral feature incident to this part of the invention consisting in the employment of a shank or base on the motor cradle through which to mount the cradle upon the standard, and to support the spring which holds the motor in normal position on its trunnions; also in utilizing a tubular projection on the motor frame to receive said spring and to provide a conduit for the wires which feed the motor, and the employment of releasable socket connections for said wires so that by removing the trunnions of the motor and slipping said socket connections, the motor with its agitator and other parts mounted thereon can be bodily removed from the apparatus for replacement or repair.

In the accompanying drawings, in which preferred and modified constructions of the several elements of the invention are shown by way of illustration—

Figures 6 and 7 and $7^a$ are detail views showing the mounting for the motor upon the standard; Figure 6 being a plan with the upper portion of the standard and the motor cradle shank in horizontal section; Figure 7 being a side elevation of corresponding parts in vertical section; and Figure $7^a$ being a sectional detail view of the motor feed-wire connections.

Figure 1:
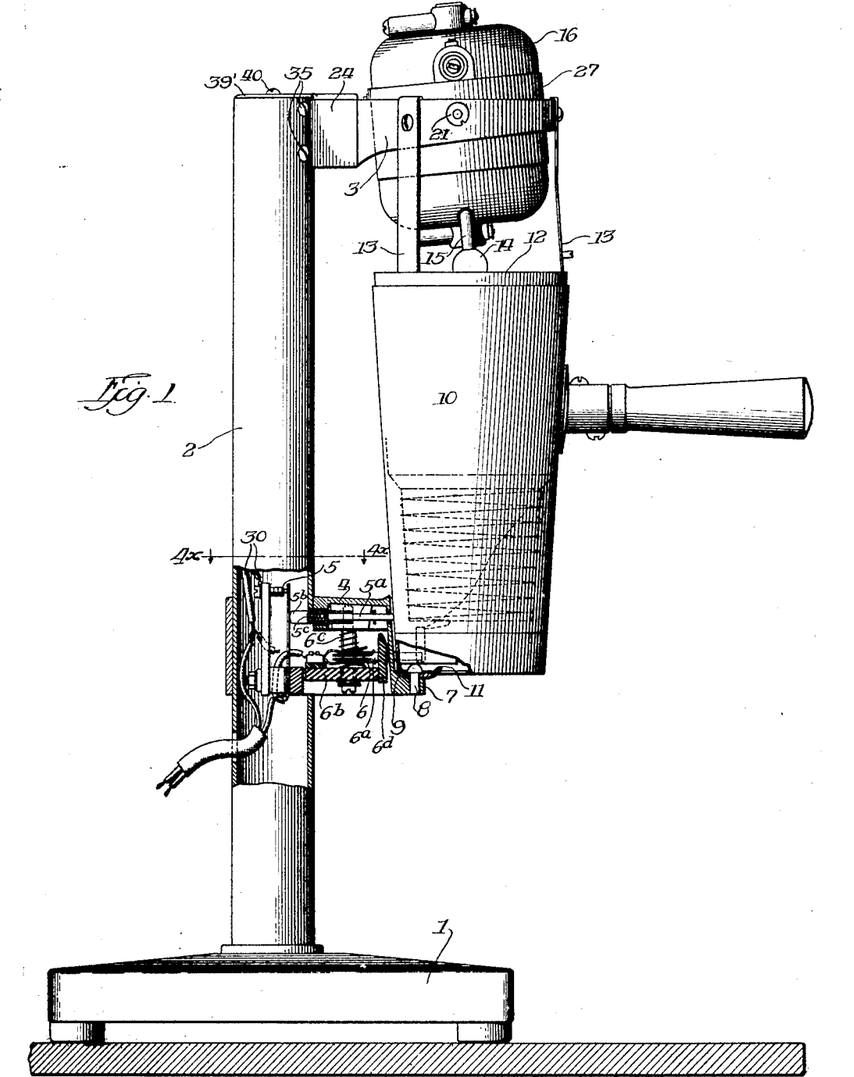
Figure 1 is a side elevation of an apparatus embodying the several features of the present invention, that portion thereof having to do with the bottom support of the vessel with the circuit closing elements controlled by the vessel, being shown in section.
Figure 8:
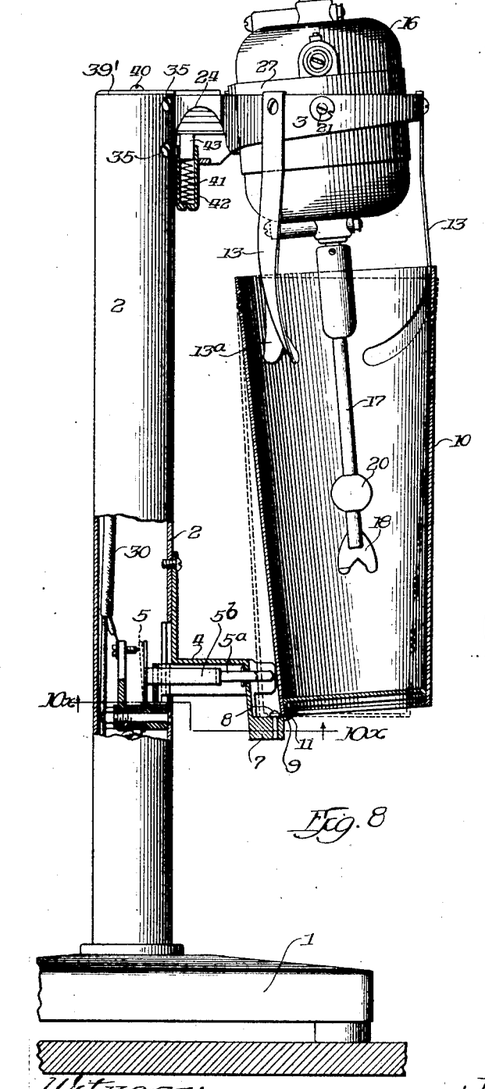
Figure 8 is a view corresponding to Figure 1 but showing the vessel in vertical section and adapted for mixing without heating, the fingers for laterally sustaining the vessel and interrupting the vortex but without the cover, and the bottom margin of the vessel in position upon the safety stop and leaving open the motor circuit closer which is controlled by the vessel.

Referring to Figures 1 to 5, 1 represents a base, 2 a standard upstanding from said base, 3 a motor cradle projecting from the upper end of the standard, and 4 a shelf or bottom support for a vessel to be assembled with the apparatus for agitating and heating its contents. Mounted in the standard 2 is a circuit closing switch 5 and within the shelf 4 are outlet sockets 6, the former of which is under control of a spring-returned thrust rod $5^a$ in position to receive the side of a vessel mounted upon the shelf while the latter is in position to receive terminal pins $6^a$ carried by the vessel. These elements may follow substantially the construction of corresponding parts of U. S. Letters Patent No. 1,491,991, issued April 29, 1924, to The Kar-Lac Company, except that the outlet sockets 6 are preferably mounted upon the table 6ᵇ yieldingly suspended upon a pair of hanger pins 6ᶜ and carrying dash plate 6ᵈ through which the terminal pins 6ᵃ of the vessel pass in reaching the outlet sockets. Shelf 4 is constructed with a step 7 having a stud 8 protruding from its upper surface in position to engage the bottom marginal portion 9 of a vessel 10 when the latter is in normal position upon the step, as shown in Figure 1; said step also being constructed with a safety stop 11 in the form of an upturned lip or projection which will engage the marginal portion 9 of the vessel and prevent the vessel from dropping in case it is carelessly applied to the step. Such a position of the vessel, in relation to a supporting step, is shown in Figure 8 of the drawings. When the vessel 10 is in position upon the step with its marginal portion 9 in engagement with the stud 8, thrust rod 5ᵃ will be held inwardly by the side wall of the vessel and the circuit closer 5 will be held in closed position, and the motor, hereinafter referred to, will be energized to drive the agitator.

Figures 2, 3, 4, 5:
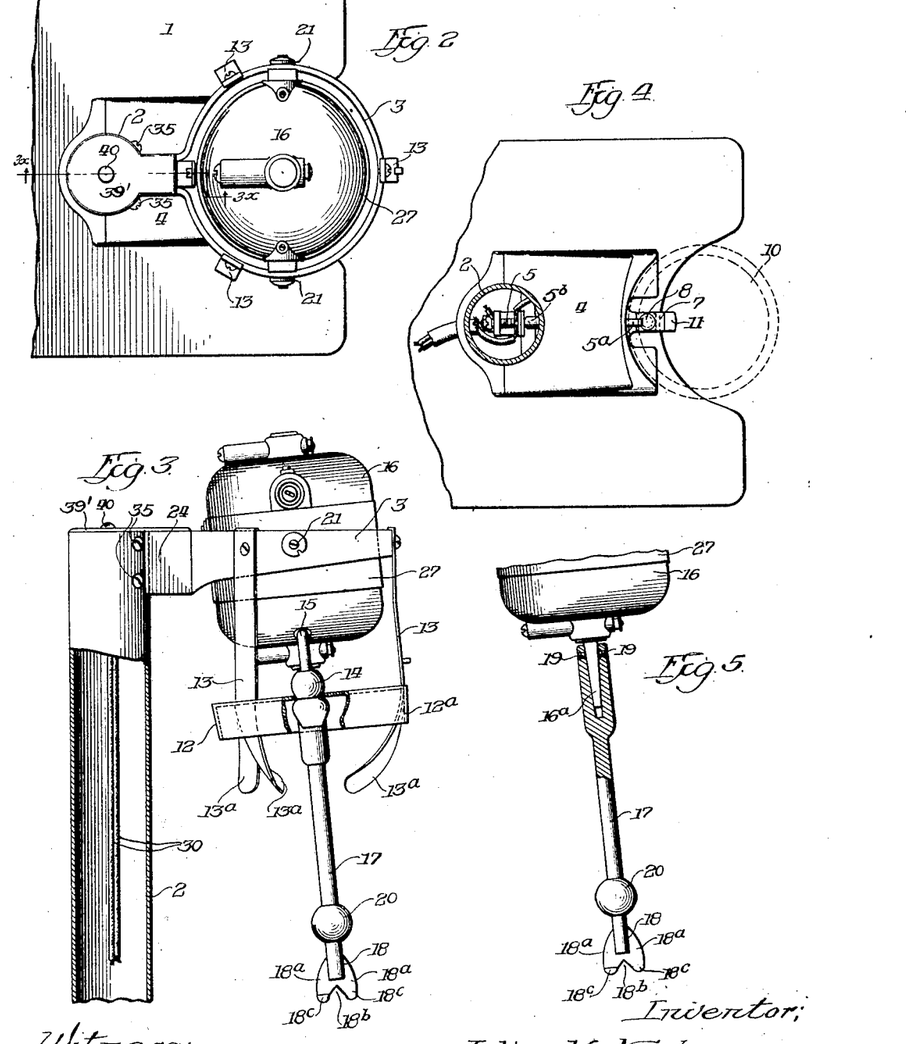
Figures 2 and 3 are, respectively, a plan view and a side elevation of the upper portion of the apparatus shown in Figure 1, with the vessel removed.
Figure 4 is a section on the line $4^x$—$4^x$ of Figure 1 looking downward.
Figure 5 is a detail view showing in section the connection between the agitator shaft and the motor.

12 represents a cover which, as shown in Figures 3 and 5, has a conoidal flange 12ᵃ fitting within the upper end of the vessel and serving to hold, or assisting to hold, the vessel against lateral displacement while it is being vertically supported by the step 7. 13 represent positioning fingers which extend through the cover 12 and acting through the latter to position the vessel independently of the cover, as hereinafter described in connection with Figure 8; and these fingers terminate in deflected lower ends 13ᵃ which occupy positions sufficiently near the inner wall of the vessel to encounter the vortex developed in the liquid of the vessel by the stirring action and break up said vortex or deflect it inwardly before it rises sufficiently to overflow the vessel. These deflected ends also assist in the mixing of the liquid contents of the vessel.

Figure 13:
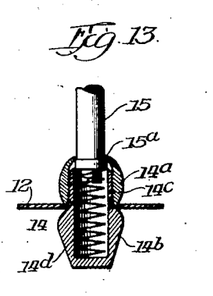
Figure 13 is a sectional detail view of one of the bulbous wrist members through means of which it is yieldingly mounted upon its supporting pins.

To sustain the cover 12 vertically, double bulb wrist members 14, or other members having a wrist portion to receive the disk portion of the cover, are mounted upon pins 15 which depend from the motor 16; and each of these wrist members, as shown in Figure 13, preferably consists of two parts 14ᵃ and 14ᵇ, enlarged on either side of the disk of the cover 12, threaded together at 14ᶜ, having the upper member 14ᵃ confined upon the pin 15 by the head 15ᵃ, and forming a housing for a spring 14ᵈ which yieldingly holds the wrist member, and through it the cover 12, downward.

The motor 16 carries an agitator shaft 17 in position to enter the vessel 10 when the latter is positioned by the fingers 13 or by said cover and fingers together. Shaft 17 carries agitator 18 which is preferably of the vane or blade type, being formed of a plurality of vanes 18ᵃ, for instance, two, enlarging downwardly or following approximately the outline of an oval, preferably separated by reentrant portion 18ᵇ, and terminating in deflected ends 18ᶜ presented oppositely to the direction of revolution. Two such vanes located in a diametric plane of the shaft 17, have been found to act with great efficiency in stirring and mixing the contents of the vessel, particularly where a solid matter, such as ice cream, may be introduced for mixing with the liquid. In order to permit the use of a vane type of agitator on a stirring shaft which revolves with the excessive speed required for efficiency in a device of this kind, several special features enter into the construction of the shaft. The agitator shaft is mounted upon the motor shaft 16ᵃ through means of a long taper joint which insures accurate coaxial relation between the two shafts, and secured thereon by means which avoids unbalancing the mass at any point, for instance, by using a plurality of symmetrically disposed set screws 19. It will be readily understood that due to the excessive speed of rotation the long tapered joint provided further insures against unbalancing for the following reason: As later described, it will be seen that the vanes are flanged and that said flanges are disposed rearwardly with respect to the direction of rotation. In operation, therefore, these vanes, due to their contact with the liquid, tend to move the agitator shaft upwardly and so effect a tighter fit due to the tapered joint. This then will tend to keep the axis of the agitator and motor shafts in constant alignment. Also, the shaft 17 embodies in its construction a symmetrically disposed inertia mass 20 in the form of a sphere, located near its free end, and which by its gyroscopic effect opposes aberration from the fixed axis of revolution. The member 20, by reason of its spherical form, also influences the stirring effect of the agitator.

In order to reduce injurious effect of contact of the vessel 10 with the agitator 17, in careless handling of the vessel when disassembling it from the machine, and particularly while residual revolution exists in the agitator, the motor 16 is pendulously supported on trunnions 21 in the cradle 3 and held at a predetermined angle of presentation with reference to the fingers 13 by some suitable form of resilient means, of which three are shown in the drawings, but which preferably consists of plate springs 22 anchored at 23 to the shank 24 of the cradle 3, and bearing at 25 beneath the horn 26 of a motor band 27, and pressing the horn upward against a stop conveniently provided by introducing a pin 28 transversely through the shank 24, the pin being preferably faced with cushioning material. By this arrangement the motor is normally positioned with its agitator 17 at a predetermined angle of presentation but resilient in the direction of outward movement of the vessel 10, so that the agitator can yield from the contact of the vessel with its lower end and partially relieve the effect of such contact. One advantage of locating the counterpoise 20 near the lower end of the agitator 17 is that it will in many instances receive the contact of the vessel and avoid impact of the revolving vanes against the side of the vessel. Horn 26 serves as a conduit for the feed wires 29 of the motor 16, and these wires, instead of extending continuously from motor circuit wires 30 in the standard 2, terminate within the upper end of the conduit 2 in ferrules 31 making slip connections with sockets 32 surrounded by insulating jackets 32a which are in turn electrically connected through bottom clips 33 with the motor circuit wires 30.

The shank 24 of the motor cradle 3 extends through a recess in the upper end of the standard 2 and is secured to the latter through means of wings 34 on the shank conforming to the inner cylindrical walls of the standard and secured thereto by screws 35; also by the projection 36 extending diametrically across the standard 2 and terminating in an upturned end 37 bolted to the rear wall of the standard at 38. 39 represents an insulating disk on the under side of the shank 24, serving as a mounting for the electrical connecting clips 33. Over the shank 24 and the several parts located within it, is a cover plate 39' resting upon the upper end of the standard 2 and upon the upper marginal portion of the shank 24 to complete the enclosure of the parts; and this cover plate is held in position by means of the screw bolt 40 passing downward through the cover and into the extension 36 of the shank. An important advantage of the construction just described is the facility which it affords for removal and displacement of the motor 16 with minimum disturbance of the parts, namely, by taking out trunnion screws 21, removing the cover plate 39', and withdrawing the feed wires 29 from the sockets 32 to remove the motor, and returning these parts 21, 39' and 29 in replacing the motor.

Figure 6:
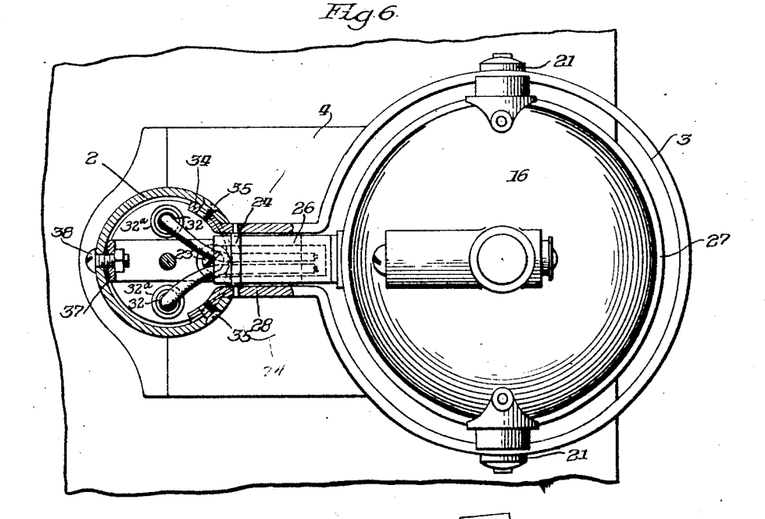
Figures 7, 7A:
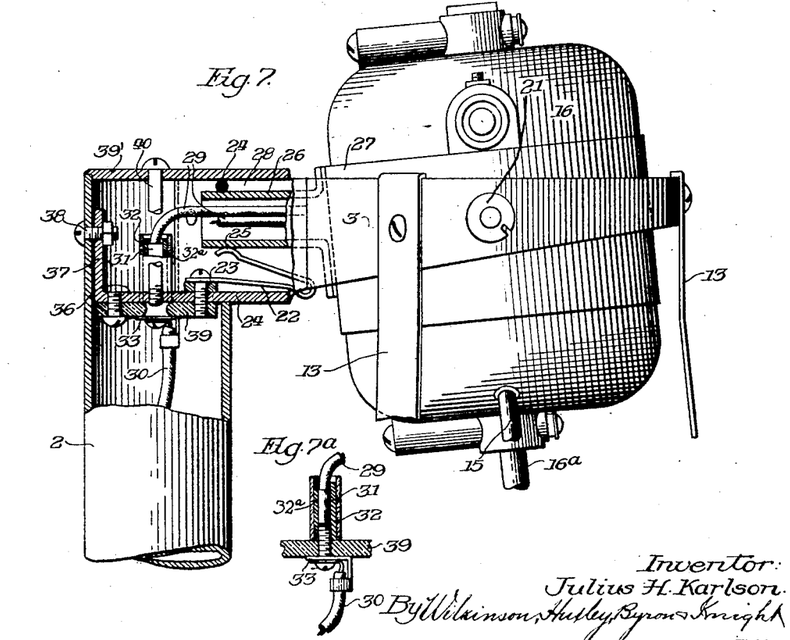

As shown in Figure 8, the vessel cover 12 and the heating circuit outlet 6 may be omitted from the apparatus, thus leaving the positioning and deflecting fingers 13 to function substantially as already described, but serving alone to sustain the upper end of the vessel against tipping and leaving the motor circuit closer 5, 5a in the shelf 4 and the step 7 with steps 8 and 11 functioning precisely as already described in connection with Figure 1. In this form of device the mounting of the motor 16 will follow the construction shown in Figures 6 and 7 in so far as the parts are correspondingly indexed by reference characters, but it is modified with respect to the spring which is employed for holding the motor in normal position, in that the spring is in the form of a spiral 41 mounted in a housing 42 and acting upon a plunger 43 carried by the horn 26 of the motor.

Figure 9:
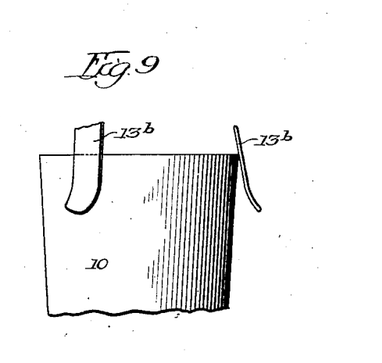
Figure 9 is a detail view of the upper portions of the vessel with positioning fingers applied to the exterior thereof.
Figure 10:
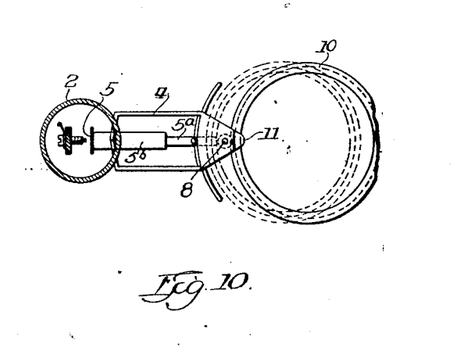
Figure 10 is a section on the line $10^x$—$10^x$ of Figure 8 looking upward.

As shown in Figure 9, the positioning fingers for the upper end of the vessel may take the form as shown at 13b and engage the outside of the vessel instead of the inside thereof, the deflecting function served by the lower ends of the fingers being, in this case, omitted.

Figure 11:
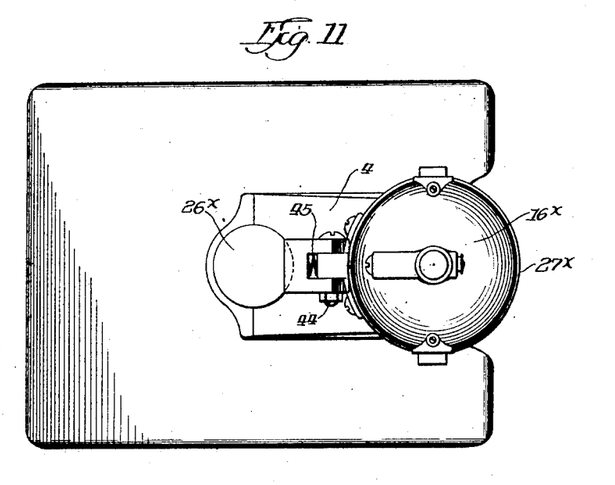
Figure 11 is a top plan view of the apparatus.
Figure 12:
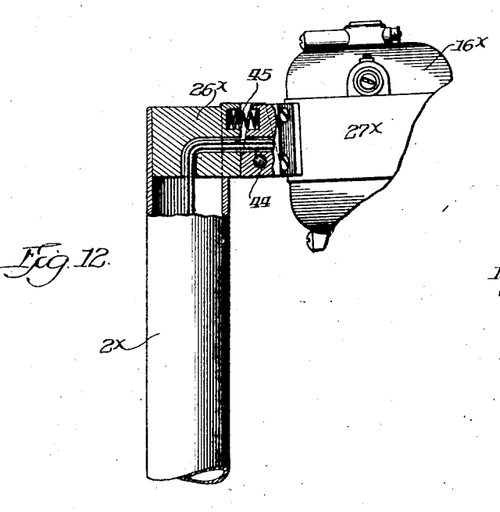
Figure 12 is a fragmentary elevation, partly in section, of the upper portion of the apparatus, in which a modified form of means for controlling the angular position of the motor is employed.

As shown in Figures 11 and 12, the motor 16x may be mounted upon the standard 2x through means of a knuckle joint 44 in a horn 26x projecting from the motor band 27x; said knuckle joint having sufficient play in a vertical plane to afford yielding movement of the motor, and the motor being resiliently held in its predetermined normal position by means of compression spring 45 introduced between the members of the knuckle joint above the pintle of the latter.

I claim:

1. In mixing apparatus, means adapted to afford vertical support for a mixing vessel, and a plurality of fingers having converging lower ends and depending in position to engage within the upper open end of a mixing vessel at a plurality of points in the circumference thereof.

2. In mixing apparatus, means adapted to afford vertical support for a mixing vessel, and a plurality of fingers having converging lower ends and depending in position to engage within the upper open end of a mixing vessel at a plurality of points in the circumference thereof; said fingers permitting relative vertical movement of the vessel after engagement therewith.

3. In a mixing apparatus, means affording vertical support for a mixing vessel, depending fingers having converging lower ends and adapted to engage within the upper end of the mixing vessel, and a cover also supported in position to engage the upper end of the vessel.

4. In mixing apparatus, means affording vertical support located to engage the lower portion of the mixing vessel, depending fingers having converging lower ends and located to engage within the upper end of the mixing vessel at a plurality of points in its circumference, a cover also located to engage the upper end of the vessel, and means independent of said fingers for supporting said cover.

5. In mixing apparatus, means affording vertical support located to engage the lower portion of the mixing vessel, depending fingers having converging lower ends and located to engage within the upper end of the mixing vessel at a plurality of points in its circumference, a cover also located to engage the upper end of the vessel, and means independent of said fingers for supporting said cover; said depending fingers permitting relative vertical movement of the vessel while in engagement therewith, and the cover yielding vertically to the vessel after engagement therewith.

6. In mixing apparatus, means affording vertical support with a mixing vessel, a cover for engagement with the upper end of said vessel, and means for supporting said cover comprising depending pins and wrist members upon which the cover is mounted with freedom of angular movement; said wrist members being supported on said pins.

7. In mixing apparatus, means affording vertical support with a mixing vessel, a cover for engagement with the upper end of said vessel, and means for supporting said cover comprising depending pins and wrist members upon which the cover is mounted with freedom of angular movement; said wrist members being supported on said pins; there being between the pins and the wrist members springs normally pressing the cover downward.

8. In mixing apparatus, means adapted to support a mixing vessel vertically, a cover for engagement with the upper end of such a vessel, and means for supporting said cover consisting of depending pins, and wrist members mounted on said pins, a wrist member consisting of telescoping parts, respectively, formed with enlargements above and below the cover.

9. In mixing apparatus, means adapted to support a mixing vessel vertically, a cover for engagement with the upper end of such a vessel, and means for supporting said cover consisting of depending pins and wrist members mounted on said pins, a wrist member consisting of telescoping parts, respectively, formed with enlargements above and below the cover; one of said telescoping parts engaging the pin which supports the wrist member with vertical movement upon the pin, and a spring being located within the telescoping members for normally pressing the wrist member downwardly.

10. In mixing apparatus, means adapted to afford vertical support for a mixing vessel, and depending fingers positioned to engage within the upper open end of such a vessel at a plurality of points in its circumference, the lower ends of said fingers being constructed with fluid deflecting portions.

11. In mixing apparatus, means for engaging and laterally positioning the upper portion of a mixing vessel, means for engaging and affording vertical support for the lower portion of such a vessel in a plurality of positions offset one from the other.

12. In mixing apparatus, means for engaging and laterally sustaining the upper portion of a mixing vessel, means for engaging and affording vertical support for the lower portion of such vessel in two different positions horizontally offset one from the other, and circuit controlling means located to be engaged by the vessel when in one of its two positions of vertical support.

13. In mixing apparatus, means for engaging and sustaining a mixing vessel laterally, and means for engaging and sustaining such vessel vertically, consisting of a step having a stop which resists horizontal displacement of the vessel, and an auxiliary stop in position to resist lateral displacement of the vessel after its release from the stop first named.

14. In mixing apparatus, means for sustaining the mixing vessel laterally, a step adapted to receive such vessel and support it vertically, a stud projecting upwardly from the surface of said step adapted to engage the vessel and resist lateral displacement on the step, and an auxiliary stop on said step outside of said stud.

15. In mixing apparatus, means affording horizontal support to a mixing vessel, means affording vertical support to such vessel in each of two different positions horizontally offset one from the other, a circuit closer engaged by the vessel when in one of said positions of vertical support, and a second circuit closer coacting with said vessel in both of said positions of vertical support.

16. In mixing apparatus, a mixing vessel, means affording vertical support to said mixing vessel in each of two positions of the vessel horizontally offset one from the other, a circuit closer actuated by the vessel when in one position of vertical support, and a circuit outlet member and terminal projection, one of which is mounted on the vessel and which cooperates to close the circuit when the vessel is in either of its positions of vertical support.

17. In mixing apparatus, a mixing vessel, a standard, a circuit closer and a circuit outlet receptacle both mounted on said standard, a step constructed to afford vertical support for the vessel in each of two horizontally offset positions of the vessel, a heating element carried by the vessel, and circuit closing terminals mounted on the vessel in position to enter the circuit outlet receptacle; the circuit closer first named being actuated by the vessel when in one of its positions of vertical support, and the heating element terminals being adapted to coact with the circuit outlet receptacle when the vessel is in either of its two positions of vertical support.

18. In mixing apparatus, an agitator, a motor carrying and driving said agitator, and supporting means upon which the motor is mounted with swinging movement, holding the motor with its agitator at a predetermined angle of presentation; said supporting means being provided with resilient means for holding the motor in said normal position.

19. In mixing apparatus, a support, a motor pivotally mounted on said support, a spring interposed between the motor and its support holding the motor in predetermined normal position, and an agitator carried by the motor and free to execute a swinging movement with the motor upon its pivotal mounting.

20. In mixing apparatus, a support, a substantially stationary motor pivotally mounted upon said support and carrying a depending agitator, a mixing vessel adapted to be assembled with the agitator by an upward movement relatively thereto, and means for supporting the vessel in assembled relation to the agitator; said agitator being adapted to yield laterally by the swinging of the motor upon its pivotal mounting when the vessel contacts with the agitator.

21. In mixing apparatus, a support, a motor cradle mounted on said support, a motor pivotally supported in said cradle and provided with a horn, and a spring engaging said horn and yieldingly holding the motor in a predetermined normal position.

22. In mixing apparatus, a support, a motor cradle having an attaching shank through which it is mounted on said support, a motor pivotally mounted in said cradle and having a horn projecting toward the support, and a spring mounted on said shank and engaging said horn to hold the motor in a predetermined normal position.

23. In mixing apparatus, a support, a motor cradle mounted on said support, a motor pivotally mounted in said cradle and having a tubular horn projecting toward the support, motor feed wires extending from the motor through said horn, and releasable circuit connections for said wires on the support.

24. In mixing apparatus, a support, a motor cradle mounted on said support, a motor trunnioned in said cradle and carrying an agitator, a horn projecting from said motor, a spring on said support engaging said horn and resiliently resisting the swinging of the motor on its trunnions in one direction, and a top engaging said horn and arresting swinging movement of the motor in the other direction.

25. In mixing apparatus, a support, a motor cradle constructed with a shank extending into and secured to said support, electric circuit terminals mounted on said shank and having connections through which they receive current for operating the motor, a motor trunnioned upon and adapted to swing in said cradle and having a horn extending toward the support, and motor feed wires releasably adapted to said terminals; said motor trunnions being removable to release the motor.

Signed at Chicago, Illinois, this 8th day of July, 1925.

JULIUS H. KARLSON.